(12) United States Patent
Walkowski

(10) Patent No.: US 10,184,583 B2
(45) Date of Patent: Jan. 22, 2019

(54) REDUNDANT LIP SEAL FOR VALVE

(71) Applicant: Eaton Corporation, Cleveland, OH (US)

(72) Inventor: Paul D. Walkowski, Ann Arbor, MI (US)

(73) Assignee: Eaton Intelligent Power Limited, Dublin 4 (IE)

( * ) Notice: Subject to any disclaimer, the term of this patent is extended or adjusted under 35 U.S.C. 154(b) by 1036 days.

(21) Appl. No.: 14/580,459

(22) Filed: Dec. 23, 2014

(65) Prior Publication Data

US 2015/0107700 A1 Apr. 23, 2015

Related U.S. Application Data

(63) Continuation of application No. PCT/US2013/031859, filed on Mar. 15, 2013.

(60) Provisional application No. 61/677,245, filed on Jul. 30, 2012.

(51) Int. Cl.
| | |
|---|---|
| *F16K 25/00* | (2006.01) |
| *B60K 15/00* | (2006.01) |
| *F16J 15/02* | (2006.01) |
| *F16K 15/00* | (2006.01) |

(52) U.S. Cl.
CPC ............ *F16K 25/005* (2013.01); *B60K 15/00* (2013.01); *F16J 15/025* (2013.01); *F16K 15/00* (2013.01); *Y10T 137/7837* (2015.04)

(58) Field of Classification Search
CPC ....... F16K 25/005; F16K 15/00; B60K 15/00; F16J 15/025; Y10T 137/7837
See application file for complete search history.

(56) References Cited

U.S. PATENT DOCUMENTS

| | | | |
|---|---|---|---|
| 5,090,533 | A | 2/1992 | Inoue |
| 5,622,484 | A | 4/1997 | Taylor-McCune et al. |
| 5,769,116 | A | 6/1998 | Yokota et al. |
| 6,834,678 | B2 | 12/2004 | Santa |
| 2003/0107187 | A1* | 6/2003 | Yajima ............... F16J 15/025 |
| | | | 277/628 |
| 2005/0103385 | A1* | 5/2005 | Takahashi ............ B67D 7/42 |
| | | | 137/540 |

(Continued)

FOREIGN PATENT DOCUMENTS

| | | |
|---|---|---|
| DE | 19 50 815 A1 | 4/1971 |
| JP | 2586741 Y2 | 12/1998 |

(Continued)

OTHER PUBLICATIONS

European Patent Office; International Search Report and Written Opinion issued in corresponding International Application No. PCT/US2013/031859. dated Sep. 20, 2013.

(Continued)

*Primary Examiner* — James M Hewitt, II
(74) *Attorney, Agent, or Firm* — Fishman Stewart PLLC

(57) ABSTRACT

A valve assembly is provided that is suitable for use in a fuel fill line. The valve assembly may include a housing having a flange that surrounds the housing. A weld foot can be molded over at least a portion of the flange. A lip seal may be disposed between the flange and the weld foot. The lip seal includes a first lip and a second lip, and the first lip and the second lip may both be in contact with a surface on one of the flange and the weld foot.

20 Claims, 3 Drawing Sheets

(56) References Cited

U.S. PATENT DOCUMENTS

| | | |
|---|---|---|
| 2005/0139271 A1 | 6/2005 | Krishnamoorthy et al. |
| 2006/0081635 A1* | 4/2006 | Matsutori .............. F16J 15/025 |
| | | 220/378 |
| 2007/0221674 A1 | 9/2007 | Mod et al. |
| 2010/0269921 A1* | 10/2010 | Pifer ................ B60K 15/03519 |
| | | 137/487.5 |
| 2015/0090346 A1* | 4/2015 | Erdmann ......... B60K 15/03519 |
| | | 137/202 |
| 2017/0158049 A1* | 6/2017 | Walkowski ............ B60K 15/04 |

FOREIGN PATENT DOCUMENTS

| | | |
|---|---|---|
| JP | 2003-97725 A | 4/2003 |
| JP | 2006-123897 A | 5/2006 |
| JP | 2012-21640 A | 2/2012 |
| WO | 93/04308 A1 | 3/1993 |

OTHER PUBLICATIONS

Translation from Japanese Office Action with translation, 2015-525418, dated May 19, 2017 (as provided by JP associate), 1 page.

\* cited by examiner

REDUNDANT LIP SEAL FOR VALVE

CROSS-REFERENCE TO RELATED APPLICATIONS

This application is a continuation of and claims the benefit of PCT Application No. PCT/US2013/031859, filed on Mar. 15, 2013, which claims the benefit of U.S. Provisional Application Ser. No. 61/677,245, filed Jul. 30, 2012, the disclosures of which are incorporated herein by reference in their entirety.

TECHNICAL FIELD

The present teachings relate to valve seals, including a lip structure for a valve seal.

BACKGROUND

Valves, such as inline check valves or other valves, may include sealing structures between two valve components to prevent leakage of fluid and/or vapor. In fuel tank applications, for example, the seal prevents fuel from leaking between layers or to the atmosphere. However, various conditions may weaken the sealing capabilities of the seal. For example, high internal pressures in the valve and/or a high differential between the pressures inside and outside the valve may cause leakage. Contamination, flash, or other debris on the sealing surface may also compromise the seal.

SUMMARY

A valve assembly is provided that is suitable for use in a fuel fill line. The valve assembly may include a housing having a flange that surrounds the housing. A weld foot can be molded over at least a portion of the flange. A lip seal may be disposed between the flange and the weld foot. The lip seal includes a first lip and a second lip that may both be contact with a surface on one of the flange and the weld foot.

Various aspects of the present teachings will become apparent to those skilled in the art from the following detailed description of the embodiments, when read in light of the accompanying drawings.

BRIEF DESCRIPTION OF THE DRAWINGS

Embodiments of the invention will now be described, by way of example, with reference to the accompanying drawings, wherein.

DETAILED DESCRIPTION

Reference will now be made in detail to embodiments of the present disclosure, examples of which are described herein and illustrated in the accompanying drawings. While the invention will be described in conjunction with embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
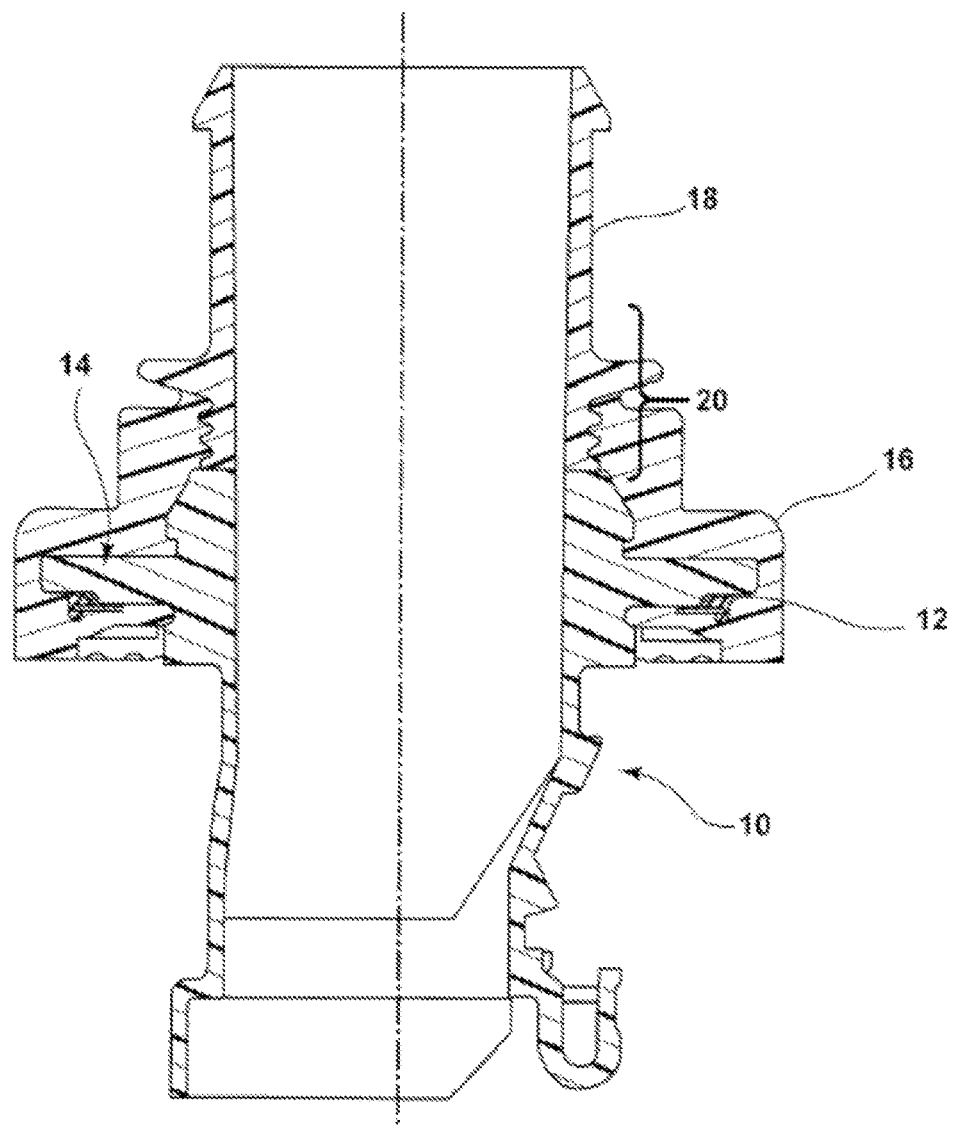
FIG. 1 is a schematic section view of a valve having a redundant lip seal according to one aspect of the teachings.

The teachings herein illustrate a valve seal having improved sealing capabilities. FIG. 1 is a representative or schematic section view of a valve 10 incorporating a lip seal 12 according to one aspect of the teachings. The lip seal 12 may be disposed between a flange 14 surrounding the valve 10 and a weld foot 16 designed or configured to be weldable onto a fuel tank. In an aspect of the teachings, the weld foot 16 may be overmolded onto a valve body 18. The valve body 18 may include an interlock surface 20 that, in conjunction with the weld foot 16, may create a labyrinth leak path that makes it difficult for fluid or vapor to escape the valve 10 and may also make the valve 10 resistant to delamination.

Figure 2:
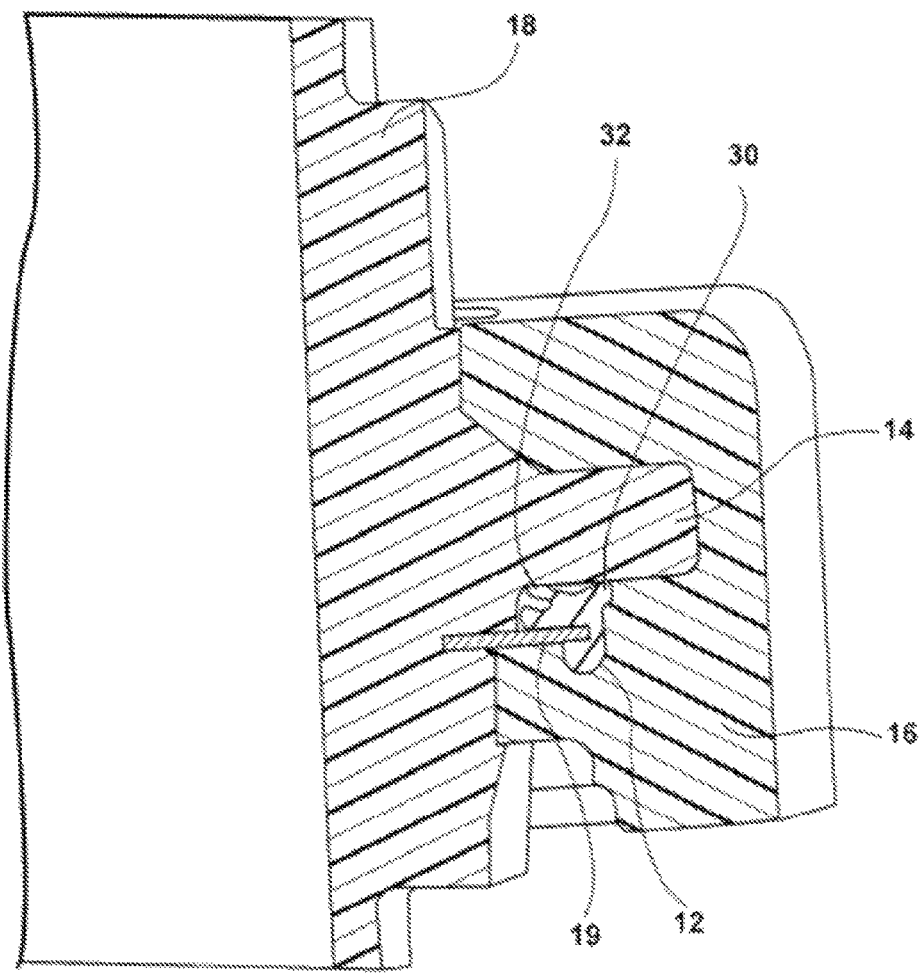
FIG. 2 is a close-up schematic view of a portion of the valve in FIG. 1.
Figure 3:
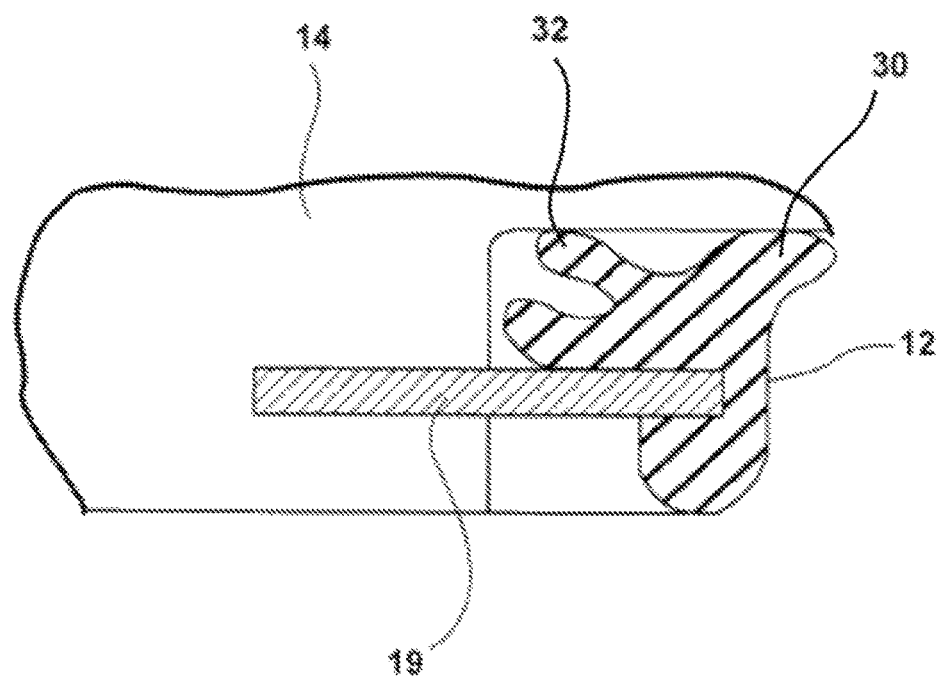
FIG. 3 is a closer schematic view of a portion of the valve in FIG. 1.

As generally illustrated in FIG. 2, a seal ring 19 may be coupled to the lip seal 12 to provide more secure interlocking between the lip seal 12 and the weld foot 16. The configuration may further improve leak-prevention robustness by, for example, preventing the lip seal 12 from being dislocated or deformed during an overmolding process. In an aspect of the teachings, the seal ring 19 may be comprised of metal. However, with embodiments, the seal ring 19 may also be comprised of other appropriate rigid materials, such as, for example, a plastic. Moreover, the seal ring 19 may also have a series of through holes, which for some embodiments or applications may mechanically hold the lip seal 12 in place comparatively better than a smooth surface and/or an adhesive between the seal ring 19 and the lip seal 12.

In embodiments, the lip seal 12 may have first and second lips 30, 32 that face different directions. In an aspect of the teachings, first and second lips 30, 32 may face opposite directions so that the lip seal 12 blocks fluid or vapor from moving past the lip seal 12 regardless of the direction of the pressure differential. This can better ensure a secure seal even when the valve 10 is tipped. The first and second lips 30, 32 can also provide a more robust labyrinth leak path and provide a backup seal in case debris compromises the sealing capabilities of one of the lips 30, 32. When a weld foot 16 is formed onto the flange 14, the lips 30, 32 deflect against the flange 14 as the lip seal 12 is compressed. In one aspect of the teachings, the flange 14 may include a shelf or step. With such a configuration, the seal ring 19 can be located against the shelf or step and the lips 30, 32 can deflect against the shelf or step to maintain uniform compression.

Although the illustrated lip seal 12 shows the lips 30, 32 deflecting in different directions, the lips 30, 32 may be designed to deflect in the same direction without departing from the scope of the disclosure. The material used to manufacture the lip seal 12 can be, for example and without limitation, a low-permeability elastomer with a very high melting temperature so that the lip seal 12 can withstand the temperatures and pressures of an overmolding process.

The valve 10 may, if desired, be manufactured using a unique overmolding process. In an embodiment, the overmolding process may contact the seal ring 19 at multiple places to hold the seal ring 19 in place more securely and perhaps also more evenly.

Alternatively, or in addition, the overmolding process may incorporate a floating steel ring inside the tooling. In an embodiment, the steel ring may be supported by high biasing force springs, such as engine valve springs, against a plurality of stops in the mold. When molten, pressurized plastic enters the mold, the floating steel ring may act like a piston and may be compressed against the springs by the plastic. As the plastic cools, shrinks, and hardens, the springs can push back and compress the plastic to prevent voids from forming.

As a result, the redundant lip seal structure 12 can prevent leaking regardless of the differential between the pressure inside the valve 10 versus outside the valve 10. Moreover, the redundant lip seal 12 can provide extra sealing surfaces to improve its sealing capabilities, even if the lip seal 12 experiences contamination or flash on its sealing surface and/or high pressure operating conditions.

It will be appreciated that the above teachings are merely exemplary in nature and is not intended to limit the present teachings, their application or uses. While specific examples have been described in the specification and illustrated in the drawings, it will be understood by those of ordinary skill in the art that various changes may be made and equivalents may be substituted for elements thereof without departing from the scope of the present teachings as defined in the claims. Furthermore, the mixing and matching of features, elements and/or functions between various examples is expressly contemplated herein so that one of ordinary skill in the art would appreciate from this disclosure that features, elements and/or functions of one example may be incorporated into another example as appropriate, unless described otherwise, above. Moreover, many modifications may be made to adapt a particular situation or material to the teachings of the present disclosure without departing from the essential scope thereof. Therefore, it is intended that the present teachings not be limited to the particular examples illustrated by the drawings and described in the specification as the best mode presently contemplated for carrying out the teachings of the present disclosure, but that the scope of the present disclosure will include any embodiments falling within the foregoing description and the appended claims.

What is claimed:

1. A valve assembly for use in a fuel fill line, the valve assembly comprising:
   a housing including a flange that surrounds the housing;
   a weld foot molded over at least a portion of the flange; and
   a seal disposed between the flange and the weld foot, wherein the seal includes a first lip and a second lip, the first lip and second lip are both in contact with a surface on at least one of the flange and the weld foot, and the first lip and the second lip are configured to compress against the flange and resist passage of fluid or vapor regardless of a pressure differential direction.

2. The valve assembly of claim 1, wherein the housing includes an interlock surface, and a portion of the weld foot is molded over the interlock surface.

3. The valve assembly of claim 1, wherein the seal is coupled to a seal ring, and the seal ring is configured to provide support for the seal.

4. The valve assembly of claim 3, wherein the seal ring includes a plurality of through holes for mechanical engagement between the seal and the seal ring.

5. The valve assembly of claim 3, wherein the seal and the seal ring are over-molded between the flange and the weld foot.

6. The valve assembly of claim 3, wherein the flange forms a stepped portion, and the seal ring engages the stepped portion to maintain deflection of the first and second lips of the seal against the flange.

7. The valve assembly of claim 1, wherein the first lip of the seal extends in a first direction and the second lip of the seal extends in a second direction.

8. The valve assembly of claim 7, wherein the first lip of the seal extends in a generally opposite direction than the second lip of the seal.

9. The valve assembly of claim 1, wherein the first and second lips of the seal are in contact with a surface of the flange.

10. A check valve assembly for use in a fuel fill line, the check valve assembly comprising:
    a housing including a flange that surrounds the housing;
    a weld foot that is secured over a portion of the housing and the flange; and
    a lip seal disposed between the flange and the weld foot, wherein the lip seal has a first lip and a second lip, the first lip and the second lip are spaced apart from one another and are in contact with a surface of the flange, and the first lip and the second lip are configured to compress against the flange and resist passage of fluid or vapor regardless of a pressure differential direction.

11. The check valve assembly of claim 10, wherein the housing includes an interlock surface and a portion of the weld foot is molded over the interlock surface.

12. The check valve assembly of claim 10, wherein the lip seal is coupled to a seal ring that provides support for the lip seal.

13. The check valve assembly of claim 12, wherein the seal ring includes a plurality of through holes for mechanical engagement between the lip seal and the seal ring.

14. The check valve assembly of claim 12, wherein the lip seal and the seal ring are over-molded between the flange and the weld foot.

15. The check valve assembly of claim 12, wherein the flange forms a stepped portion, and the seal ring engages the stepped portion to maintain uniform deflection of the first and second lips of the lip seal against the flange.

16. The check valve assembly of claim 10, wherein the first lip of the lip seal extends in a first direction and the second lip of the lip seal extends in a second direction.

17. The check valve assembly of claim 16, wherein the first lip of the lip seal extends in a generally opposite direction than the second lip of the lip seal.

18. A check valve assembly comprising:
    a housing having a flange that surrounds the housing, and the flange defines a stepped portion;
    a weld foot molded over at least a portion of the flange; and
    a lip seal including a first lip and a second lip, and the lip seal is coupled to a seal ring,
    wherein the lip seal is disposed between the flange and the weld foot such that the seal ring engages the step portion of the flange, the first and second lips are in contact with a surface of the flange, and the first lip and the second lip are configured to compress against the flange and resist passage of fluid or vapor regardless of a pressure differential direction.

19. The check valve assembly of claim 18, wherein the housing includes an interlock surface and a portion of the weld foot is molded over the interlock surface.

20. The check valve assembly of claim 18, wherein the first lip of the lip seal extends in a first direction and the second lip of the lip seal extends in a second direction that is generally opposite the first direction.

* * * * *